(12) United States Patent
Hennenhoefer et al.

(10) Patent No.: US 7,941,822 B2
(45) Date of Patent: May 10, 2011

(54) INTELLIGENT DEVICE SYSTEM AND METHOD FOR DISTRIBUTION OF DIGITAL SIGNALS ON A WIDEBAND SIGNAL DISTRIBUTION SYSTEM

(75) Inventors: Earl Hennenhoefer, Harrisburg, PA (US); Richard V. Snyder, Harrisburg, PA (US); Robert D. Stine, Dillsburg, PA (US)

(73) Assignee: CBV, Inc., Carlisle, PA (US)

( * ) Notice: Subject to any disclaimer, the term of this patent is extended or adjusted under 35 U.S.C. 154(b) by 264 days.

(21) Appl. No.: 12/068,102

(22) Filed: Feb. 1, 2008

(65) Prior Publication Data

US 2008/0134273 A1 Jun. 5, 2008

Related U.S. Application Data

(62) Division of application No. 09/749,258, filed on Dec. 27, 2000, now Pat. No. 7,346,918.

(51) Int. Cl.
 *H04N 7/16* (2011.01)
 *H04N 7/173* (2011.01)
 *H04J 3/24* (2006.01)

(52) U.S. Cl. ........... 725/82; 725/74; 725/78; 725/80; 370/230.1; 370/542; 455/3.01

(58) Field of Classification Search .......... 725/112, 725/113, 74–85; 455/3.01; 330/100; 370/230.1, 370/329, 542

See application file for complete search history.

(56) References Cited

U.S. PATENT DOCUMENTS

| | | | |
|---|---|---|---|
| 5,347,304 A | 9/1994 | Moura et al. | |
| 5,485,630 A | 1/1996 | Lee et al. | |
| 5,544,161 A | 8/1996 | Bigham et al. | |
| 5,557,319 A | 9/1996 | Gurusami et al. | |
| 5,608,446 A | 3/1997 | Carr et al. | |
| 5,805,806 A | 9/1998 | McArthur | |
| 5,828,403 A | 10/1998 | DeRodeff et al. | |
| 5,875,386 A | 2/1999 | Flickinger et al. | |
| 5,886,732 A | 3/1999 | Humpleman | |
| 5,901,340 A | 5/1999 | Flickinger et al. | |
| 5,982,411 A | 11/1999 | Eyer et al. | |
| 5,982,741 A | 11/1999 | Ethier | |
| 6,008,777 A | 12/1999 | Yiu | |
| 6,021,158 A | 2/2000 | Schurr et al. | |
| 6,041,056 A | 3/2000 | Bigham et al. | |
| 6,124,878 A | 9/2000 | Adams et al. | |
| 6,208,833 B1 | 3/2001 | Preschutti et al. | |
| 6,481,013 B1 | 11/2002 | Dinwiddie et al. | |
| 6,493,875 B1 | 12/2002 | Eames et al. | |
| 6,526,581 B1 | 2/2003 | Edson | |
| 6,567,981 B1 | 5/2003 | Jeffrey | |
| 6,622,304 B1 | 9/2003 | Carhart | |
| 6,757,909 B1 | 6/2004 | Maruo et al. | |
| 6,796,555 B1 | 9/2004 | Blahut | |
| 6,915,530 B1 | 7/2005 | Kauffman et al. | |
| 7,068,682 B2 | 6/2006 | Campbell | |
| 2003/0128303 A1 | 7/2003 | Masuda | |

*Primary Examiner* — Christopher Kelley
*Assistant Examiner* — Reuben M Brown
(74) *Attorney, Agent, or Firm* — Buchanan Ingersoll & Rooney, P.C.

(57) ABSTRACT

A plurality of intelligent device systems for use with a wideband signal distribution network, and methods for transmitting digital information and receiving digital and non-digital information onto and off of an RF carrier through a wideband signal distribution network, are disclosed. The intelligent device systems provide networks of intelligent devices that modulate and demodulate digital video, IP video/data/voice and digital wireless onto, and off of, a wideband signal distribution system, such as an analog carrier system, using existing EIA/TIA 568 standard wiring infrastructure. The methods modulate and demodulate digital video, IP video/data/voice and digital wireless onto, and off of, a wideband distribution system, such as an analog carrier system, and separate IP portions from non-IP portions.

31 Claims, 9 Drawing Sheets

INTELLIGENT DEVICE SYSTEM AND METHOD FOR DISTRIBUTION OF DIGITAL SIGNALS ON A WIDEBAND SIGNAL DISTRIBUTION SYSTEM

This application is a divisional of application Ser. No. 09/749,258, filed on Dec. 27, 2000 now U.S. Pat. No. 7,346,918, the entire contents of which are hereby incorporated by reference.

CROSS REFERENCE TO RELATED APPLICATION

Not applicable.

STATEMENT REGARDING FEDERALLY SPONSORED RESEARCH OR DEVELOPMENT

Not Applicable.

BACKGROUND OF THE INVENTION

1. Field of the Invention

The present invention is directed generally to a method and system for signal distribution and, more particularly, to an intelligent device system and method for distribution of digital signals onto, and off of, a wideband signal distribution system.

2. Description of the Background

The workplace currently has telephone and data networks that allow for both verbal communication and the exchange of information via words, pictures, and numbers. However, bringing the communication media of television and video into the networked environment has presented new difficulties. In particular, digital TV/video applications clog data networks, even with the use of available compression techniques, such as MPEG2. Analog RF distribution may require special cables and infrastructure, or more complex technologies.

However, using a wideband signal distribution system, such as that disclosed in U.S. Pat. No. 5,901,340, TV and video, both digital and analog, can now move between locations in a building or campus just as easily, and using the same infrastructure, as voice and data. In fact, TV, video, PBX, IP, and other data types can be moved over the same types of wires, including some unused wires, that already exist in most networked environments. For example, telephone and computer networks in most buildings are wired to meet a single, internationally accepted wiring standard using, such as Category 5 or better twisted pair wiring. Residential buildings are often wired to similar standards. In typical applications using analog video over standard wiring systems, the analog video arrives uncompressed, and the user sees it on a TV, PC or monitor in enhanced quality. This method of live-feed video transfer allows for the removal of space consuming files and applications currently stored on a network.

However, using solely uncompressed analog transfer of information does not fully solve the need to download to individual users large quantities of digitized images (video, film, animation, simulations, etc.), and to thereby allow those digital images to be displayed with the enhanced quality such digital images can offer. At times, critical needs for digital video, such as analyzing or editing images, arise that cannot be handled by purely analog signal transfer. Additionally, where digital video information is sent over a baseband LAN, i.e. Ethernet, the performance of the system is often severely degraded as the digital video is sent simultaneously to an increasingly greater number of receivers.

Furthermore, digital IP data has historically been transferred using digital data networks, i.e. has been transferred in a digitized format over a network capable of transporting a purely digitized format. However, analog carrier networks, using twisted pair wiring, for example Category 5 Cable or better, have the capability to transport digital video, IP voice/data/video, as well as analog video, efficiently and cost effectively. This capability is not presently used due to the lack of a method to get such signals onto and off of such a carrier network.

It would be desirable to transport the digitized data on an analog carrier, such as over the existing Category 5 or better cable, in a format that would allow for greater amounts of data to be carried at one time, such as by modulated RF. In addition, it may be desirable in the future to use media other than Category 5 or better cabling to wire buildings. Alternative wiring media, or wireless media, could allow the network to overcome bandwidth problems by providing significantly improved data transfer speeds and increased bandwidth. Such alternative media could allow the network to overcome the aforementioned problems in transferring data and video over networks in a digitized format. However, such alternative wiring media will also require the complete rewiring of many networks on, perhaps, a building environment level, as all Category 5 or better cable will need to be replaced with the new media, in order to provide the enhanced capabilities of the alternative media system to all users.

Therefore, the need exists for a network of intelligent devices that enables digital video, IP voice/data/video, to be modulated and demodulated onto and off of, preferably, a wideband signal distribution system or component equivalent, such as an analog carrier system. Such an intelligent device network would facilitate the use of, for example, the existing global EIA/TIA 568 standard wiring infrastructure in a particular environment, such as an office building, to significantly increase the information throughput. Additionally, such an intelligent device network would eliminate the need to rewire a building or add expensive optoelectronic equipment to increase throughput on the existing infrastructure.

BRIEF SUMMARY OF THE INVENTION

The present invention is directed to a signal distribution system, including at least one intelligent device system, for putting digital signals onto, and taking digital signals off of, a wideband signal distribution system. A wideband signal distribution system typically includes a distribution unit having a plurality of inputs and outputs, and a series of cables, such as twisted pair cable, running between a plurality of outlets and the inputs and outputs of the distribution unit.

An intelligent device system may be, for example, a local RF receiver/baseband out intelligent device system. The local RF receiver/baseband out intelligent device system includes at least one addressable device having at least one input and at least one output, a BUD that receives a signal, which signal includes at least a digital signal portion, from the output of an intelligent device, and the intelligent device that receives, from the BUD, a modulated RF signal carrying at least a digital signal portion thereon. The intelligent device splits the IP signal portion from a non-IP signal portion, and removes the modulated RF carrier from the digital signal portion before sending the digital signal portion to the input of at least one of the addressable devices, and sending the non-IP signal portion to a standard outlet. The intelligent device may include at least one DSP that controls the demodulation and filtering. Additionally, the local RF receiver/baseband out intelligent device may include wireless capability.

An intelligent device system may also be, for example, an intelligent device system for remote sending. The intelligent device system for remote sending preferably includes at least one incoming signal generator, wherein an incoming signal generated includes at least a IP signal portion, a BUD that receives the incoming signal at least one input port, and that includes at least one output port, and a remote send intelligent device that generates a modulated RF signal carrying the IP signal portion thereon. The remote send intelligent device may include an RF channel detector that detects the RF channels in use and a DSP that receives the RF channel in use information from the RF channel detector, and that receives traffic data from a traffic sensor. The DSP uses the RF channel-in-use information to select the RF carrier, and, if desired, the RF carrier channel width, and, if desired, the RF guardband width, for the incoming signal, and uses the traffic data to select at least one of at least one modulator to condition each incoming signal. Additionally, the remote send intelligent device may include wireless capability.

An intelligent device system may also be, for example, an intelligent device system for local sending and receiving. The intelligent device system for local sending and receiving preferably includes at least one addressable device having at least one input and at least one output, wherein at least one of the addressable devices generates an incoming signal, wherein the incoming signal includes at least a IP signal portion, an intelligent device that generates modulated RF signal carrying the IP signal portion thereon, and a BUD that receives the modulated RF signal. The intelligent device receives a modulated RF signal carrying, at least, the digital signal portion thereon from the BUD, and splits the IP signal portion from a non-IP signal portion. The intelligent device then removes the RF carrier from the IP signal portion and sends the IP signal portion to the input of at least one of the addressable devices, and sends the non-IP signal portion to a standard outlet. The intelligent device for local sending and receiving may additionally include wireless capability.

The present invention is also directed to several methods for transmitting digital information on a RF carrier through a wideband signal distribution network. The first method includes providing at least one addressable device having at least one input and at least one output, sending a signal to a BUD from the output of said at least one addressable device, which signal includes at least a IP signal portion, receiving from the BUD at an intelligent device, a modulated RF signal carrying the, at least, digital signal portion thereon, splitting and filtering by the intelligent device of the IP signal portion from a non-IP signal portion, removing, by the intelligent device, the RF carrier from the IP signal portion, sending, by the intelligent device, of the IP signal portion to the input of at least one addressable device, and sending, by the intelligent device, of the non-IP signal portion to a standard outlet. A wireless capability may also be included.

The present invention is also directed to a second method for transmitting digital information on an RF carrier through a wideband signal distribution network. The method includes providing at least one addressable device having at least one input and at least one output, generating, by at least one of said addressable devices, of an incoming signal, wherein the incoming signal includes at least an IP signal portion, generating a RF modulated RF signal carrying the IP signal portion thereon, receiving, at a BUD, the modulated RF signal, receiving, at an intelligent device, of a modulated RF signal carrying the at least one digital signal portion thereon from the BUD, splitting and filtering, by the intelligent device, of the IP signal portion from a non-IP signal portion, removing, by the intelligent device, of the RF carrier from the IP signal portion, sending, by the intelligent device, of the IP signal portion to the input of at least one addressable device, and sending, by the intelligent device, of the non-IP signal portion to a standard outlet.

The present invention is also directed to a third method for transmitting digital information on an RF carrier through a wideband signal distribution network. The method includes generating of an incoming signal, wherein the incoming signal includes at least an IP signal portion, and generating a modulated RF signal carrying the IP signal portion thereon.

The present invention solves problems experienced in the prior art, because the present invention provides a network of intelligent devices than enable digital video, IP voice/data/video to be modulated and demodulated onto and off of, preferably, a wideband signal distribution system, such as an analog carrier system, and further allows the splitting off of any analog signal. Further, the intelligent device network facilitates the use of, for example, the existing EIA/TIA 568 standard wiring infrastructure in particular environments, such as office buildings, to significantly increase the information throughput, and eliminates the need to rewire a building or add expensive optoelectronic equipment to increase throughput on the existing infrastructure. These and other advantages will be apparent to those skilled in the art from the detailed description hereinbelow.

BRIEF DESCRIPTION OF THE SEVERAL VIEWS OF THE DRAWING

For the present invention to be clearly understood and readily practiced, the present invention will be described in conjunction with the following figures, wherein.

DETAILED DESCRIPTION OF THE INVENTION

Figure 1:
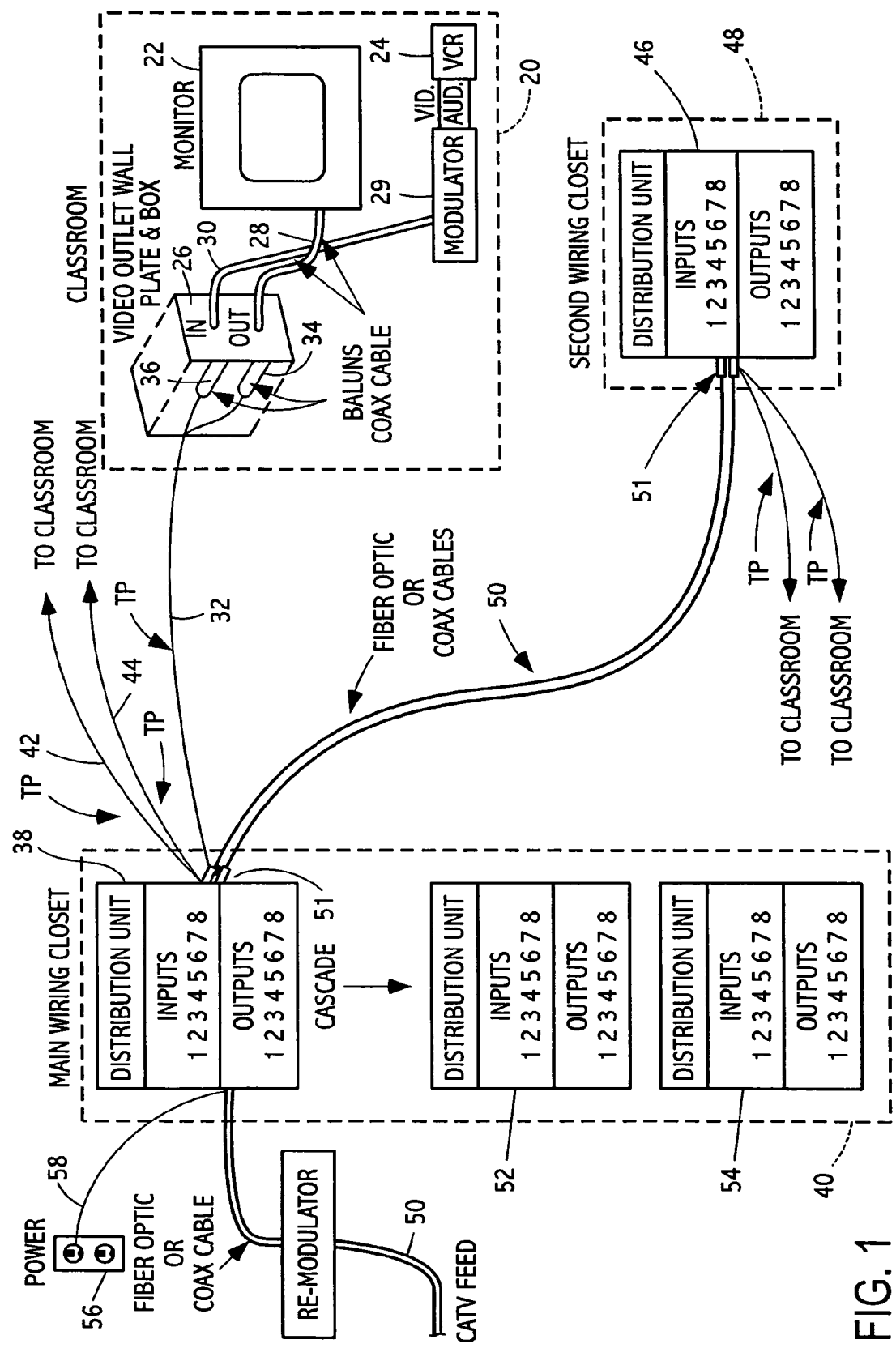
FIG. 1 is a block diagram illustrating a wideband signal distribution system used in a display environment.

It is to be understood that the figures and descriptions of the present invention have been simplified to illustrate elements that are relevant for a clear understanding of the present invention, while eliminating, for purposes of clarity, many other elements found in a typical data distribution system. Those of ordinary skill in the art will recognize that other elements are desirable and/or required in order to implement the present invention. However, because such elements are well known in the art, and because they do not facilitate a better understanding of the present invention, a discussion of such elements is not provided herein.

Digital transmission systems, including digital networks such as direct broadcast satellite, cellular telephone, personal communications service, wireless cable, cellular wireless cable, paging and wireless local loop, often employ analog waveforms, such as RF carrier waveforms, as a physical-layer transport mechanism for the baseband, i.e. the information carrying, waveform, as is known in the art. In such an instance, the baseband waveform is super-imposed on a higher-energy waveform to thereby allow for travelling of the baseband information over greater distances than would otherwise be possible with the baseband information alone.

Historically, cable TV, broadcast TV, analog cellular, analog paging and AM/FM radio, for example, have comprised analog signals that traveled on modulated RF carriers, which modulated signals have comprised, for example, signals in the frequency range of 5 MHz to several GHz. Additionally, traditional local analog signals have been carried on twisted-pair wires in simple baseband form, without a modulated carrier.

Traditional baseband and multiplexed analog signals are examples of analog transmission formats. In the case of traditional baseband or multiplexed analog communication, analog signals are sent over analog transmission channels, as is known in the art. Digital carriers, such as T-1 lines, are examples of digital transmission channels for digital baseband signals. Digital baseband signals are comprised of digitized bitstreams, which bitstreams may be formed by a sampling, such as by PCM, of, for example, a voice signal, as is known in the art. In the case of digital transmission of baseband signals, digital signals are generally sent over digital transmission channels. However, both analog and digital signals can be sent using modulation carriers, such as in digital PCS and cellular telephone, DBS (direct broadcast satellite), wireless cable and cellular wireless cable, or hybrid fiber coax, for example.

PCM is an example of binary coding, a simple coding method to form a baseband digital signal in which one bit, transmitted in one second, requires one Hertz of bandwidth. More complex coding methods, known as "multilevel coding", such as quadrature amplitude modulation (QAM) or vestigial sideband (VSB), are capable of greater bandwidth efficiency than PCM. However, the more complex the coding technique, the higher the requirements for signal-to-noise ratio of the transmission channel, and, consequently, complicated techniques such as QAM could not historically be carried directly by available analog transmission techniques, such as category 5 or higher 568 wiring systems, without exceeding the FCC emission limits and therefore resulting in degradation of the data. Wideband signal distribution systems have addressed the transmission of analog data, on a carrier within a specified frequency range, using a standard wiring system such as EIA/TIA 568, with minimal signal degradation, but have not addressed the transmission of digital data on a carrier on those media.

Following coding, a signal may be modulated, as discussed hereinabove, before it is transmitted. Any single modulation carrier, at any set frequency, can have 360 different phases, each offset by one degree. Digital modulation systems, such as quadrature amplitude modulation (QAM), take advantage of this to insert digital data at defined points as the RF carrier moves through a single oscillation cycle. Digital information can be sent on an RF analog carrier using the present invention.

FIG. 1 is a block diagram illustrating a wideband signal distribution system 10 used in a display environment 20. The distribution system 10 distributes signals within a specified frequency range, such as 5 MHz in excess of 1 GHz. The system of FIG. 1 can be utilized for distributing any wideband signals, which wideband signals may be any digital or analog signal, or any RF carrier signal between 5 MHz to in excess of 1 GHz, for example. The typical display environment 20 for the wideband signal distribution network includes a display 22 and a source of signals 24, such as a VCR or cable or digital cable TV, which source may be remotely located.

A twisted pair wire cable 32 is connected to input and output ports of a BUD 38 situated in, for example, wiring closet 40, and carries thereon the output to the monitor 22 and the input from the source 24. The BUD is discussed further hereinbelow with respect to FIG. 3. As used herein, "BUD" is defined as any type of unit or components for the distribution of wideband signals. The BUD 38 is connected to additional display environments 20a via the twisted pair wire cables 42, 44 and is cascaded to another distribution unit 46 in a second wiring closet 48 by either coaxial cables or fiber optic cables 50 connected to the distribution unit 38 through impedance matching devices 51. It will be understood that twisted pair wire cable could be utilized depending upon the distance between the wiring closets 40, 48. Further, the BUD 38 may be cascaded to the distribution units 52, 54 within the same wiring closet 40.

Figure 2:
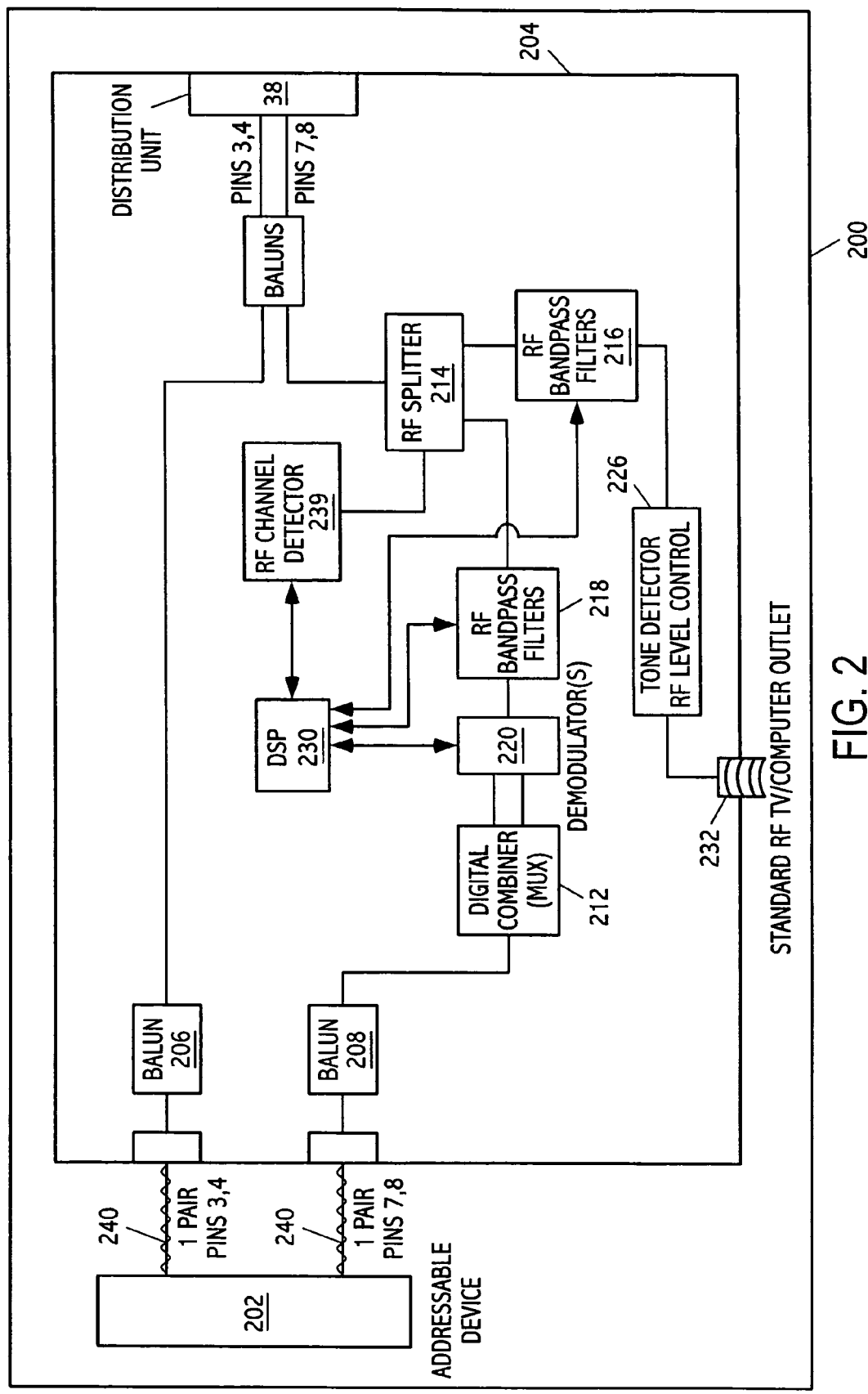
FIG. 2 is a block diagram illustrating a local RF receiver/baseband out intelligent device system for use in sending baseband information to a wideband signal distribution system and receiving digital and non-digital information from the wideband signal distribution system.

FIG. 2 illustrates a local RF receiver/baseband out intelligent device system 200 for use in receiving digital and analog information on an RF carrier, which carrier may be, for example, between 5 MHz to in excess of 1 GHz, from a wideband signal distribution system, and for use in sending baseband digital information to a wideband signal distribution system 10, such as the wideband distribution system of FIG. 1. The local RF receiver/baseband out intelligent device system 200 includes at least one addressable device 202, and an intelligent device 204 that includes input 206 and output 208 baluns, and, if necessary, at least one digital combiner 212, an RF splitter 214, at least two RF band pass filters 216, 218, at least one demodulator 220, a tone detect RF level control circuit 226, a DSP 230, an RF Channel detector 239 and a standard outlet 232, which, as defined herein, includes, but is not limited to, a standard RF television/computer outlet.

Each intelligent device system 200, 400, 500, 600, 700 and 800 of the present invention, in FIGS. 2, 4, 5, 6, 7 and 8 offers the advantage that a high amount of throughput can be achieved in the transmission of digital and/or analog information on an RF, for example, 5 MHz to in excess of 1 GHz, carrier.

The wideband signal distribution system 10 may allow for distribution of, for example, 29 channels, wherein each channel is 6 MHz in width, and it is known that such channels can handle analog video signals. However, where digital information can be transmitted over the RF channel, each 6 MHz channel can handle, depending on the modulation technique used, in excess of 40 megabits per second of digital information, and new modulation techniques may increase this information to, and in excess of, 100 megabits per second. This 40 megabits per second transmission allows for the transmission rate in excess of one gigabit/sec of digital information to be carried on the sum of the 29 RF channels in the wideband signal distribution system 10. Using advanced modulation techniques will allow the wideband signal distribution system 10 to be expanded up to 60, or more, channels, thereby further increasing throughput data rate.

Figure 1A:
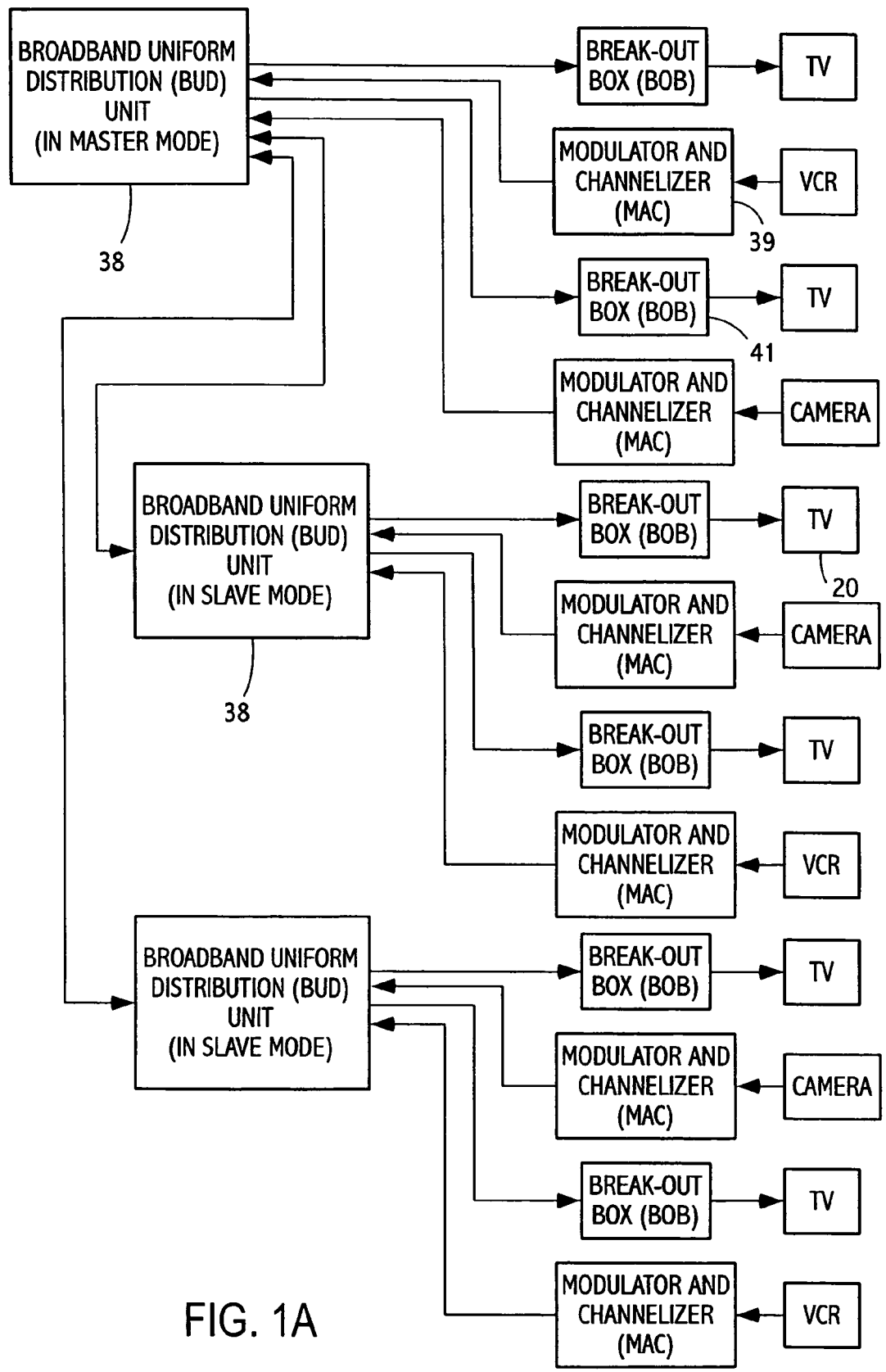
FIG. 1A is a block diagram illustrating a wideband distribution system configuration.

The wideband signal distribution system 10 functions as a passive infrastructure to distribute wideband signals modulated onto RF carriers within a specified frequency band among a plurality of outlets 20, which outlets may be to and/or from outlets, such as the plurality of intelligent devices 204, 404, 504, 604, 704 and 804 as used in the intelligent device systems 200, 400, 500, 600, 700 and 800 of FIGS. 2, 4, 5, 6, 7 and 8. As used herein, wideband is defined as a signal or signal sets having an analog or digital characteristic that can be distributed on a carrier of 5 MHz to in excess of 1 GHz, for example. A wideband signal distribution system 10, as shown in FIG. 1A, preferably includes at least one broadband uniform distribution (BUD) unit 38, at least one modulator and channelizer (MAC) 39, at least one breakout box (BOB) 41, wiring, such as twisted pair or fiber, and coaxial cable, in order to effectuate connections. Although the wideband signal distribution system 10 is the preferred transport system for the present invention, the embodiment presented herein is exemplary, and the manner of use of an equivalent component system will be apparent to those skilled in the art and is within the scope of the present invention.

Figure 3:
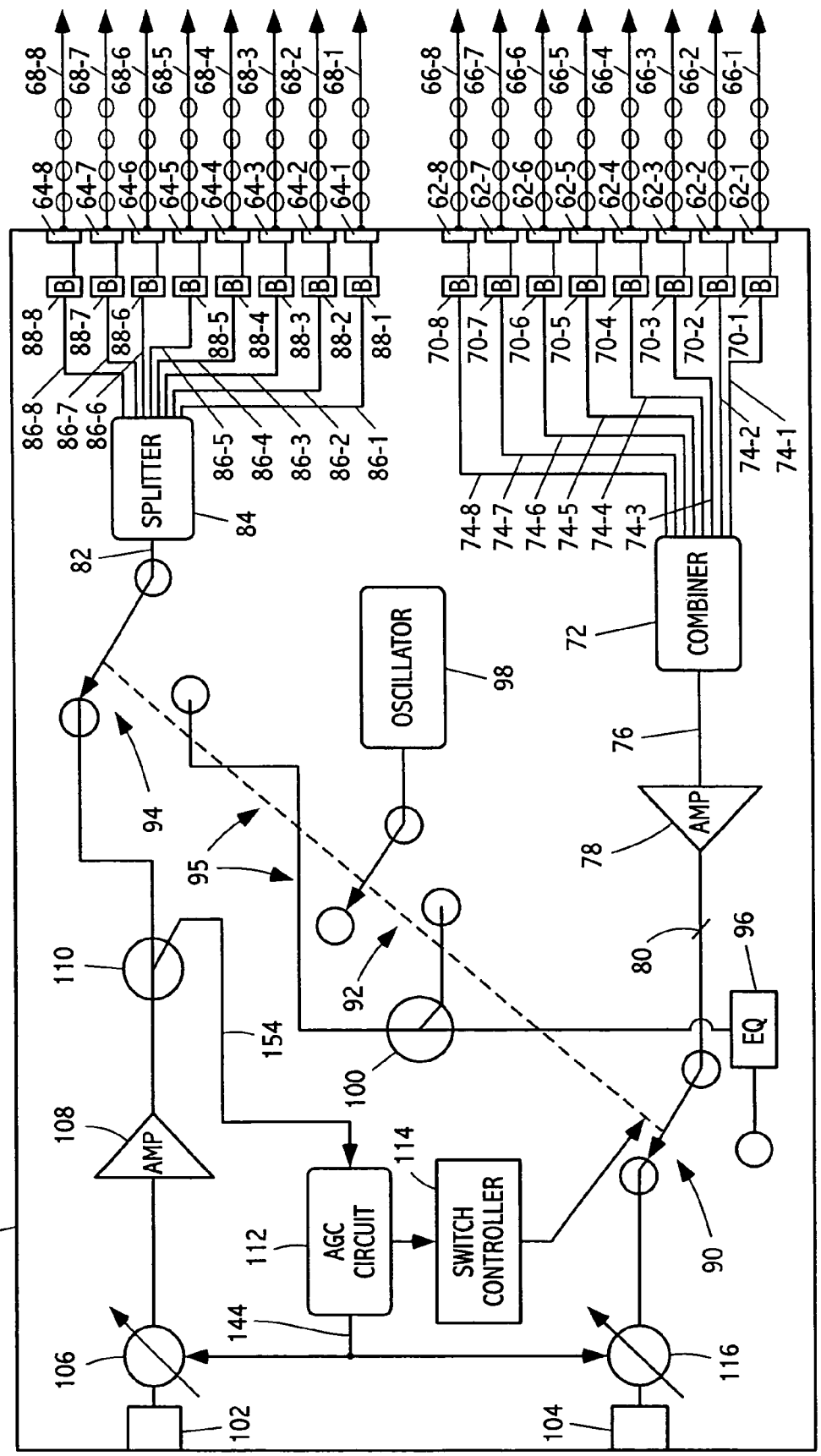
FIG. 3 is a block diagram illustrating a typical BUD unit.

A typical BUD unit 38 is illustrated in FIG. 3. Each BUD unit 38, 46, 52, 54, such as those shown in FIG. 1, preferably has eight input ports and eight output ports. If there are only eight outlets in the system, then a single distribution unit 38 can accommodate all the outlets. However, for more than eight outlets, at least one more distribution unit cascaded to a distribution unit 38 is required. In this situation, the distribution unit 38 is considered to be a "master" unit and the additional distribution unit is considered to be a "slave" unit, as discussed further hereinbelow. An attribute of the distribution units is that the units are preferably identical and automatically configure themselves to operate either in the master mode or in the slave mode.

The distribution unit 38, utilizing twisted pair wire cable, includes eight input ports 62-1, 62-2, 62-3, 62-4, 62-5, 62-6, 62-7, 62-8 and eight output ports 64-1, 64-2, 64-3, 64-4, 64-5, 64-6, 64-7, 64-8. Each of the ports 62, 64 is adapted for connection to the two wires of a respective twisted pair 66, 68. Additionally, FIG. 3 illustrates the master/slave switch as having three parts 90, 92, 94, with all of the switch parts being shown in the "slave" position. The default state of the master/slave switch is to its master position, so that the amplifier output 80 is coupled through the switch part 90 a transmission path 95 including the equalizer 96, which connects the amplifier output 80 to the splitter input 82, through the switch parts 90, 94. At the same time, the switch part 92 couples the output of the oscillator circuit 98 to the transmission path 95 through the directional coupler 100. Thus, when the distribution unit 38 is operated in the master mode, the signals appearing at the input ports 62 are combined, looped back, combined with an oscillator signal, and transmitted out all of the output ports 64.

Each BUD 38 preferably includes cascade in 102 and cascade out ports, and gain and equalization control 112 to provide proper gain or attenuation of signals within the system. Additionally, the BUD preferably includes a combiner 72 for applying signals appearing at all of the input ports to the transmission path, and a splitter 84 for applying signals appearing at the transmission path to all of the output ports. When the BUD is switched to "master state", it couples the transmission path to the combiner 72 and the splitter 84. When the BUD 38 is switched to "slave state", it couples the combiner 72 to the signal outlet instead of to the transmission path and couples the splitter 84 to the signal inlet instead of to the transmission path.

"Master state" and "slave state" switching may be done automatically through the use of a tone system. When a secondary BUD 38 is added to a system, it preferably senses a tone produced by the "master" BUD and automatically switches to "slave state". In a preferred embodiment, the BUDs 38 are substantially identical and automatically configure themselves to operate when connected to the system. At least one BUD unit is connected to the intelligent device 204 of the intelligent device system 200 of FIG. 2, and each BUD unit 38 of the present invention also includes wiring to at least two pin pairs, such as pins 3,4 and 7,8, to thereby mirror the pins to and from the addressable device 202 of FIG. 2.

Returning now to FIG. 2, the local RF receiver/baseband out intelligent device system 200 includes an addressable device 202, preferably includes at least two twisted pair of cables 240, or coaxial cables, for example, which cabling 240 is shown as connected to pins 3,4 and pins 7,8, for example, and which cabling 240 passes to and from the addressable device 202 to the intelligent device 204 of the intelligent device system 200. The addressable device 202 may be, for example, an Ethernet card, or a NIC card, in a computer, or may be a display device that displays digital information, such as a digital television. The addressable device 202 preferably has an address, such as an IP address, assigned thereto, to allow communications directed to that particular address to be delivered thereto.

In a preferred embodiment, the twisted cable pair 240 from the addressable device 202 is preferably passed within the intelligent device 204 to at least one balun 206, which balun 206 performs impedance matching, such as to match a balanced twisted pair system 240 to a single ended system. The balun 206 may be any device known to those skilled in the art used to perform impedance matching in RF applications. The two pair of twisted pair cable may be, for example, unshielded twisted pair cable, or may be devices known in the art capable of replacing twisted pair cable, such as optical fiber or coaxial cable.

The intelligent device 204 receives the modulated RF signal, which may include IP and non-IP signal portions thereon, via the RF system input. The intelligent device also receives at least one incoming digital signal, such as a digital IP signal, from pins 3,4 of the addressable device. The RF system input may be, for example, connected to the at least one BUD 38, on pins 7,8, as mentioned hereinabove, after the BUD 38 has received the incoming digital signal from pins 3,4.

The modulated RF signal, including at least one digital signal, is, upon receipt at the intelligent device from the BUD 238, preferably split into an IP portion of the incoming signal, and into a non-IP portion of the signal. The signal entering the intelligent device is preferably split by at least one RF splitter 214, and is then differentiated according to the information frequency on the incoming carrier. For example, the non-IP portion, digital or analog, of the signal may be passed through a first band pass filter 216 that passes only the band of the RF carrier that includes the non-IP portion, and is preferably then fed to a standard RF television/computer outlet 232. Only pre-selected RF channels, as discussed hereinabove, are allowed to pass to this standard outlet 232.

These non-IP RF channel signals may pass through a tone detector with an RF level control circuit 226, in order to insure that a high quality picture signal is received at the television, monitor, or PC. The tone detector with RF level control circuit 226 conditions the output RF signal to the standard RF TV/computer outlet 232 so as to not be over or under the specifications for high picture quality.

The IP portion of the modulated RF signal is fed through a second bandpass filter 218 that passes a band outside the band passed by the first bandpass filter 216, and the IP portion modulated RF signal is then demodulated by a demodulator 220. The bandpass filters 216, 218 may be electronically controlled by the DSP 230. The demodulator 220 strips the RF carrier signal from the digital baseband signal, as is known in the art. Following demodulation, the IP digital signals are combined by a digital combiner 212, such as a multiplexer, if necessary, in order to effectuate a parallel to serial conversion. The output of the digital combiner 212 is a high speed serial digital output. The output of the digital combiner 230 is routed to at least one addressable device 202 via the output cable pair, such as pins 7 and 8, and may be so routed via a balun 208, if necessary, for impedance matching. The digital information is thereby provided to the addressable device 202.

The DSP 230 (digital signal processor) of FIG. 2 is a DSP 230 as is known in the art. The DSP 230 preferably controls RF channel detection and the at least one demodulator 220. Additionally, in a preferred embodiment, the DSP 230 controls the bandpass filters 216, 218.

Figure 4:
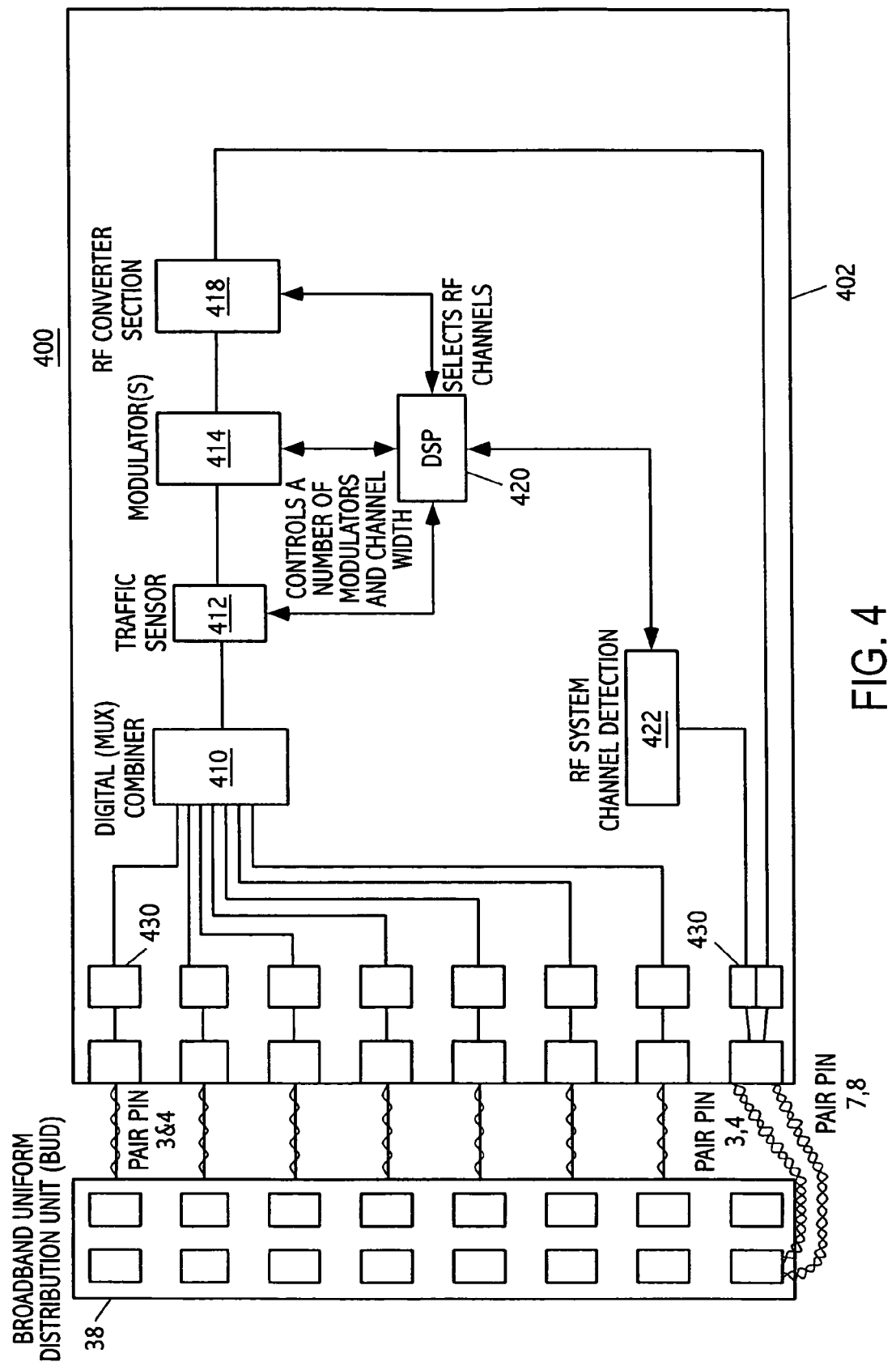
FIG. 4 is a block diagram illustrating an intelligent device system for the remote sending of digital information using RF modulation.

FIG. 4 illustrates an intelligent device system 400 for the remote sending of digital transmissions using modulated RF. The remote send-only intelligent device system 400 includes, external to the intelligent device 402, a plurality of incoming signals, such as from a desktop unit or desktop video feed, which signal is at least, in part, IP data, but which may include non-IP data, a BUD 238, and a remote send intelligent device 402 that may include a digital combiner 410, a traffic sensor 412, at least one modulator 414, an RF converter section 418, a DSP 420, an RF system channel detector 422, and, if necessary, input/output baluns 430 or other impedance matching hardware. The digital signal may be incoming to an input port of a BUD. This signal may exit, for example, an output port of a BUD, in a twisted pair output, for example, such as on pins 3 and 4, and may then be passed to the remote send intelligent device 402.

Upon receipt at the intelligent device 402, the signal may be passed through a balun 430, as discussed hereinabove, and is then preferably fed to a digital combiner 410, such as a multiplexer. In a preferred embodiment, each signal fed to the digital combiner 410 may be, for example, ten megabits per second, and numerous signals from numerous output ports of the BUD 238 may be combined as specified according to the type of digital combiner 410 used. For example, in an embodiment wherein eight ten megabit per second channels enter an 8 way multiplexer, the signal exiting the digital combiner 410 would exit at eighty megabits per second.

The signal exiting the digital combiner 410 is sent to a modulator bank 414 including at least one modulator, and the signal entering the modulator bank 414 is preferably measured via a traffic sensor 412 to determine if the information volume is greater than the normal capacity of, for example, a single modulator. If the volume is greater, the DSP 420 will, in turn, direct the incoming data to as many modulators as necessary to modulate all data from the combiner 410. The traffic sensor 412 may additionally feed information to, or receive information from, the DSP 420, in order to effectuate the decision of the modulators to be used. The DSP 420 is discussed further hereinbelow.

The at least one modulator 414 communicatively connected to the traffic sensor 412 conditions the signal to a modulated digital signal via methods known to those skilled in the art, such as QAM modulation. The output of the modulator 414 is then modulated to a set carrier channel frequency by an RF converter section 418, which RF converter section 418 may consist of, for example, oscillators, amplifiers, combiners, channel selectors, and channel width adjustors.

The digital signal processor (DSP) 420 is a DSP as is known in the art, and determines the number of modulators, or the channel width or widths, needed to modulate the signal incoming to the traffic sensor 412, as well as the number of RF channels, and which RF channels, on which the output of the modulator or modulators is modulated. Note that, for example, where QAM modulation is used, QAM modulation is generally 40 megabits per second, per 6 MHz RF channel, thus requiring the use of two 6 MHz RF channels in order to modulate the 80 megabits per second coming from the digital combiner in the exemplary embodiment hereinabove. The RF channel frequency is selected from at least two available frequency channels. However, the channel width can, for example, be increased from 6 MHz per channel to 12 MHz per channel in order to accommodate, for example, the 80 megabits per second digital stream, if adjacent channel space is available or unused. Further, through the use of an RF system channel detector 422, the DSP 420 is updated as to the channels that are currently in use by the wideband signal distribution system, thereby indicating the channels and bandwidth that are currently available for use by the system. The DSP 240 may additionally place a guardband between channels, or perform other signal conditioning functions, and may be the same DSP, or a different DSP, than that in FIG. 2, 4, 5, 6, 7 or 8.

Figure 5:
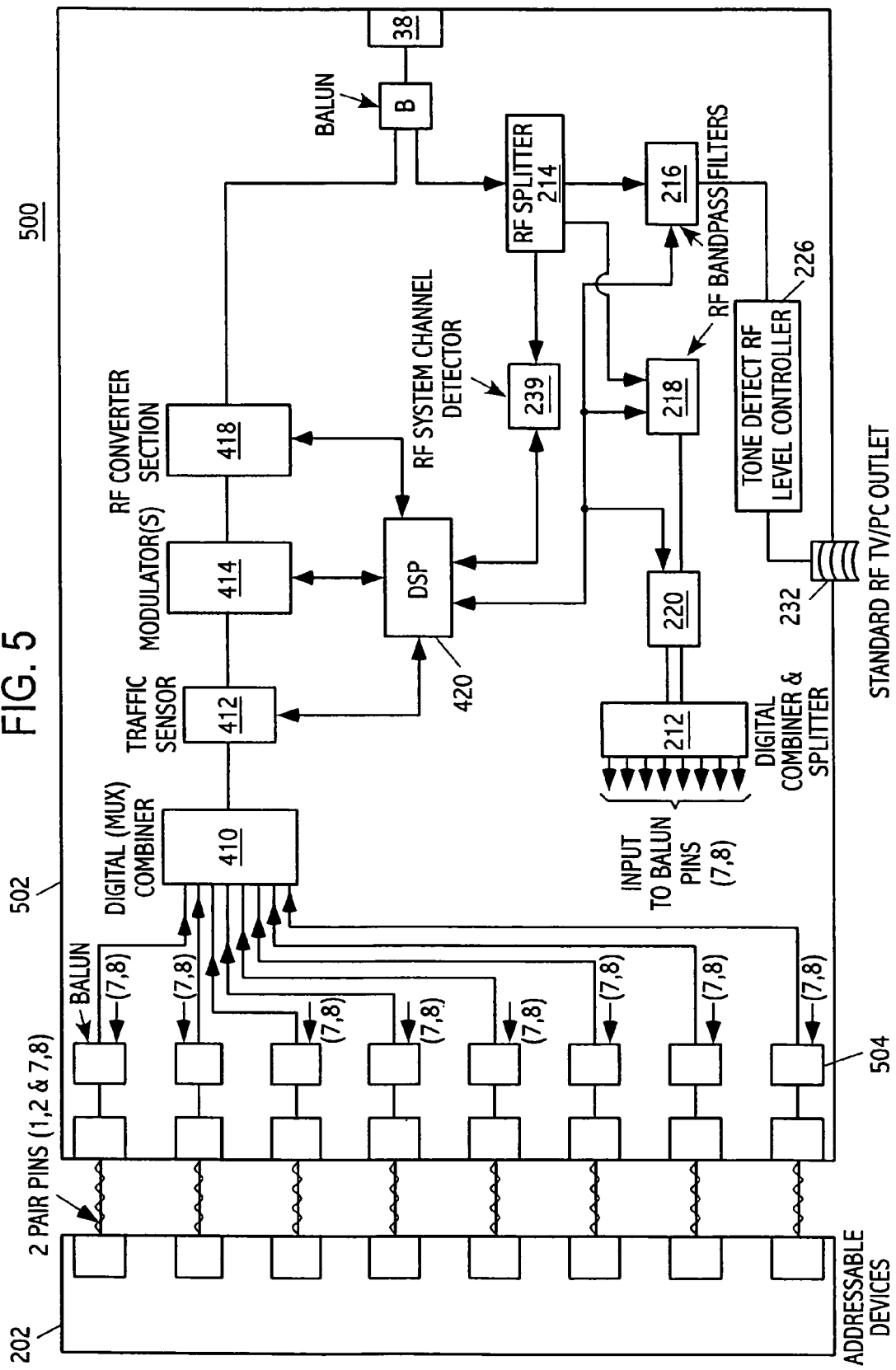
FIG. 5 is a block diagram illustrating an intelligent device system for use in local sending of digital information and receiving of digital and non-digital information using RF modulation.

FIG. 5 is a block diagram illustrating an intelligent device system 500 for use in local sending and receiving in the generation of at least one digital signal on a modulated RF signal. The local send and receive intelligent device system 500 includes certain of the devices of FIGS. 2 and 4.

The system of FIG. 5 preferably includes a plurality of addressable devices 202, such as Ethernet or NIC cards, or digital display devices, as discussed hereinabove with respect to FIG. 2, which addressable devices 202 are preferably located at, for example, a desktop location. In a preferred embodiment, wherein twisted pair cable is used, two unused pin pairs, such as pins 1,2 and 7,8, are used to send and receive signals between the addressable device 202 and the intelligent device 502. The plurality of unused twisted pairs, such as pins 1,2 and 7,8 of each addressable device 202, are then connected into an intelligent device 502, such as the local send and receive intelligent device 502, and may pass within the intelligent device 502 to at least one balun 504, for impedance matching.

The signals incoming from each of the addressable devices 202 are combined by a digital combiner 410, and passed through a traffic sensor 412, at least one modulator 414, and an RF converter section 418. The traffic sensor 412, at least one modulator 414, and RF converter section 418 may be controlled by, or be in communication with, a DSP 420, substantially as discussed hereinabove with respect to FIG. 4. Further, an RF system channel detector is preferably in communication with the DSP 420 in order to update the DSP 420 as to the RF channels in use and available.

The output of the RF converter section 418 is preferably impedance matched to a BUD 38, and feeds the signal exiting the RF converter section 418 to the BUD input port or ports. The BUD output port or ports then feed an RF splitter 214, which splits the signal entering the intelligent device 502, and the signal is then differentiated according to the information frequency on the incoming carrier. The RF splitter 214 sends the information of the RF channels in use to the RF system channel detector 239. The modulated RF signal is preferably differentiated into an IP portion, i.e. a digital data portion, of the incoming signal, and into a non-IP portion of the signal, according to the information frequency on the incoming carrier. In an embodiment wherein this differentiation is performed by at least two bandpass filters 216, 218, the bandpass filters may be electronically controlled by the DSP 420. The non-IP portion, digital/analog, of the signal is passed through a bandpass filter 216 and is preferably then fed to a standard RF television/computer outlet 232. Only pre-selected RF channels, or electronically selected RF channels selected by, for example, a DSP 420, as discussed hereinabove, are allowed to pass to the RF television/computer outlet 232, such as, for example, any or all of the 29 channels provided using the wideband distribution system 210.

The non-IP RF channel signals may pass through a tone detector with an RF level control circuit 226, in order to insure that a high quality picture signal is received at the television/computer 232. The tone detector with RF level control circuit situates the output RF signal to the standard RF television/computer outlet to not be over or under the limitations for proper picture display.

The IP portion of the modulated RF signal is fed through a second bandpass filter 218 that passes a band outside the band passed by the first bandpass filter 216, and the IP portion is then demodulated by at least one demodulator 220. The demodulator 220 strips the RF carrier signal from the digital baseband signal, as is known in the art. Following demodulation, the digital signals may be combined by a digital combiner 212, such as a multiplexer, in order to effectuate a parallel to serial conversion. The output of the digital combiner 212 is a high speed serial digital output, on the order of, for example, up to, or in excess of, several Gbit/sec. The output of the digital combiner 212 is then preferably routed to a splitter, which splitter feeds an outgoing signal to the input pin pairs, such as pins 7 and 8, of at least one addressable device 202. The input cable pair to the addressable device 202, such as pins 7 and 8, may be routed via a balun, if necessary, for impedance matching.

Figure 6:
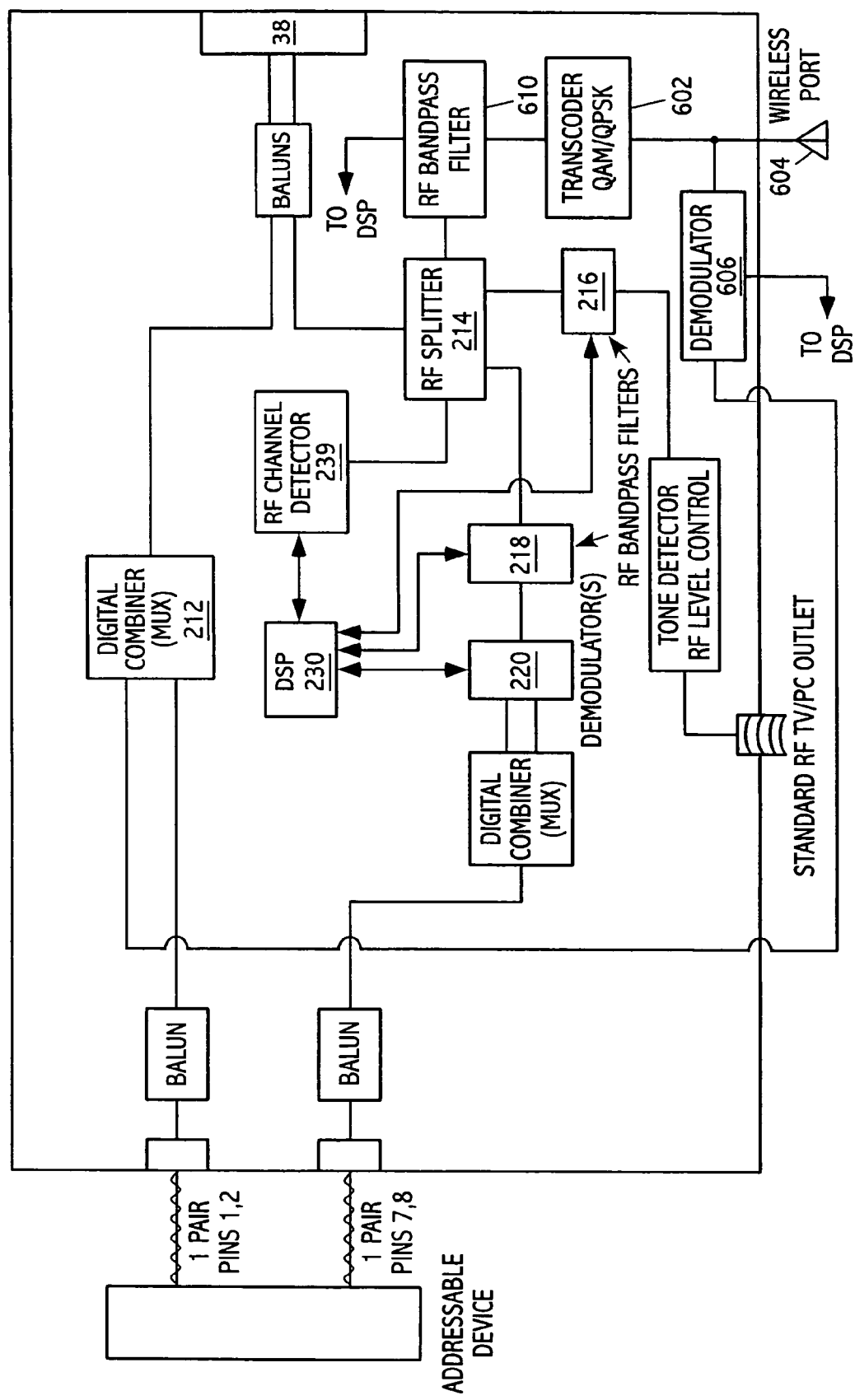
FIG. 6 is a block diagram illustrating an intelligent device system including wireless capability.

FIG. 6 is a block diagram illustrating an intelligent device system including wireless transmission 600. The intelligent device system of FIG. 6 operates substantially in accordance with FIG. 2 discussed hereinabove, for example, and additionally includes a transcoder 602 for sending transmissions from the RF splitter 214 to the wireless port 604, and a wireless demodulator 606 for receiving transmissions from the wireless port 604 and sending those received wireless transmissions to the digital combiner 212 for entry to the BUD 38. The RF splitter 214 sends the signal to a third bandpass filter 610 that passes only the RF channels having wireless information thereon, and the transcoder 602 converts the modulation scheme from, for example, QAM to QPSK, and also up converts the frequency to allow transmission via the wireless port 604. The wireless port 604 may include, for example, a wireless antenna.

Figure 7:
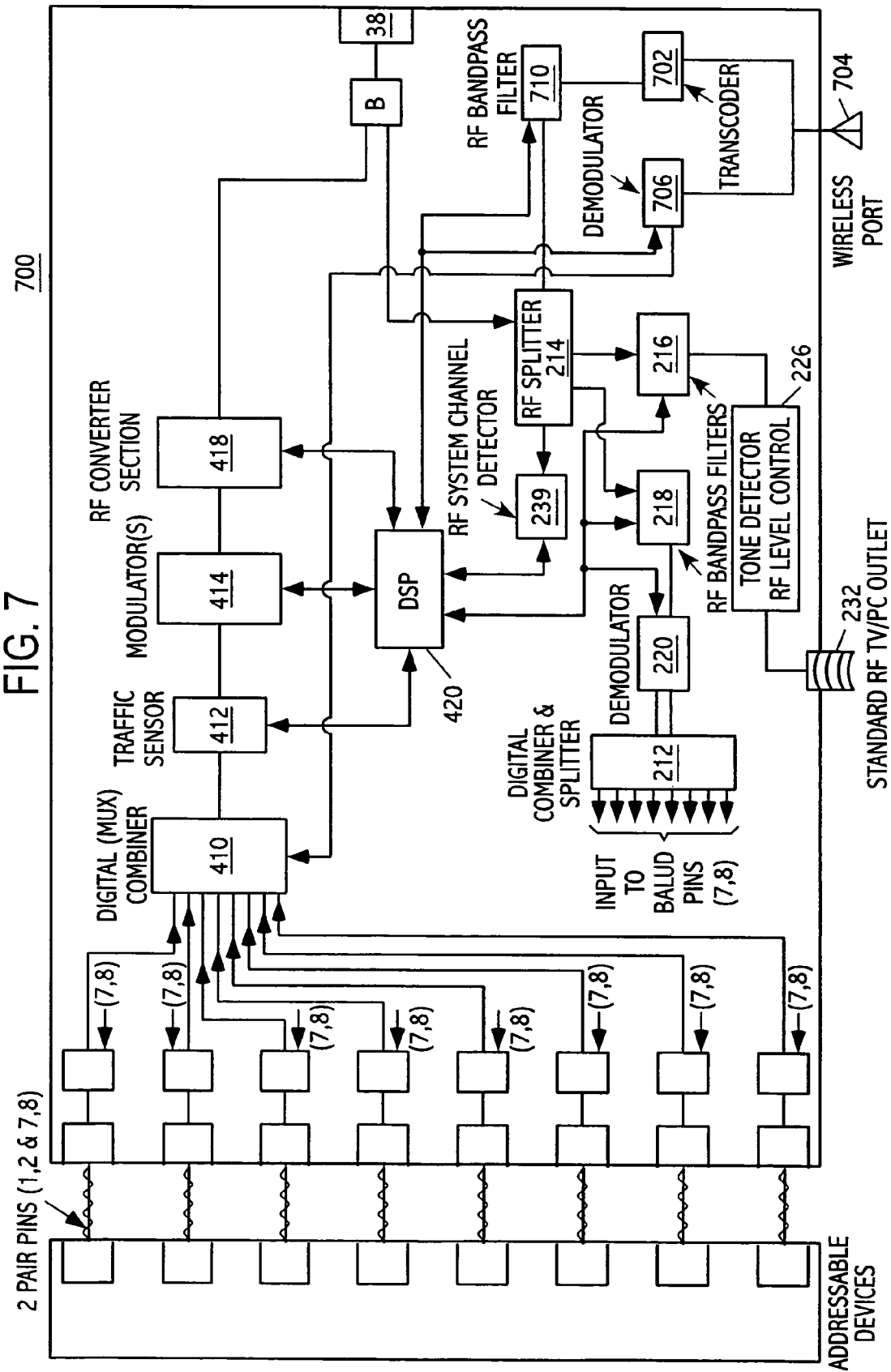
FIG. 7 is a block diagram illustrating a send and receive intelligent device system including wireless transmission.

FIG. 7 is a block diagram illustrating a send and receive intelligent device system 700 including wireless transmission. The intelligent device system 700 of FIG. 7 operates substantially in accordance with the system of FIG. 5, for example, and additionally includes a transcoder 702 for sending transmissions from the RF splitter 214 to the wireless port 704, and a wireless demodulator 706 for receiving transmissions from the wireless port 704 and sending those received wireless transmissions to the digital combiner 410. The RF splitter 214 sends the signal to a third bandpass filter 710 that passes only the RF channels having wireless information thereon, and the transcoder 702 converts the modulation scheme from, for example, QAM to QPSK, and also up converts the frequency to allow transmission via the wireless port 704. The wireless port 704 may include, for example, a wireless antenna.

Figure 8:
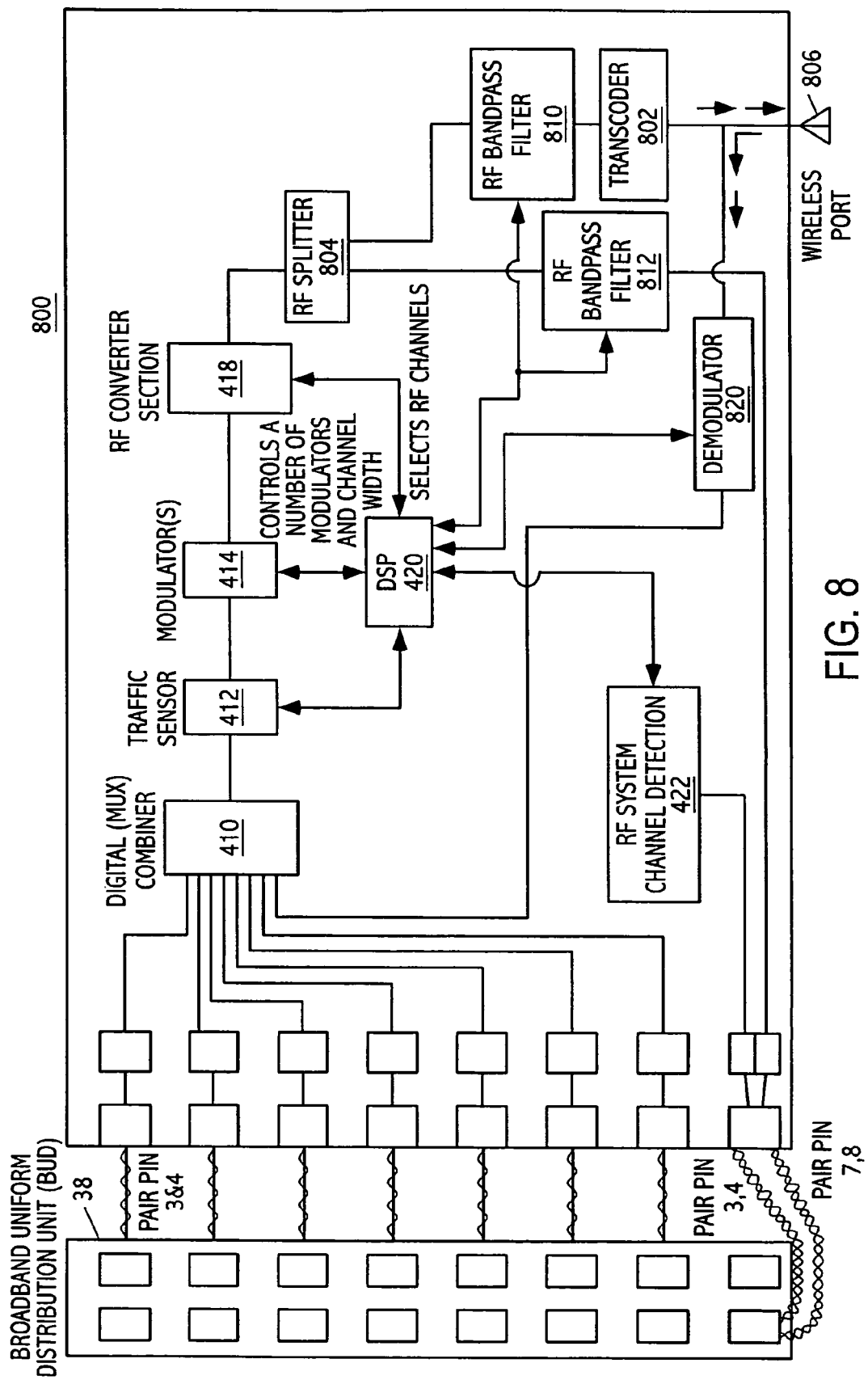
FIG. 8 is a block diagram illustrating a remote send intelligent digital system including wireless capability.

FIG. 8 is a block diagram illustrating an intelligent device system 800 including wireless transmission. The intelligent device system of FIG. 8 operates substantially in accordance with FIG. 4 discussed hereinabove, for example, and additionally includes a transcoder 802 for sending transmissions from the RF splitter 804 to the wireless port 806, and a wireless port 806 for sending those received wireless transmissions to the digital combiner 410 for entry to the BUD 38. The RF splitter 804 sends the signal to a first bandpass filter 810 that passes only the RF channels having wireless information thereon, a second bandpass filter 812 passes the non-wireless information, and the transcoder 802 converts the modulation scheme from, for example, QAM to OPSK, and also up converts the frequency to allow transmission via the wireless port 806. The wireless port 806 may include, for example, a wireless antenna. Additionally, a demodulator 820 demodulates wireless information for entry to the digital combiner 410.

Those of ordinary skill in the art will recognize that many modifications and variations of the present invention may be implemented. The foregoing description and the following claims are intended to cover all such modifications and variations.

What is claimed is:

1. An intelligent device for receiving and processing RF signals, comprising:
   an input configured to receive a modulated RF signal containing multiple channels, and to receive channel in use information which identifies each channel in the modulated RF signal that includes information addressed to at least one addressable device;
   a demodulator unit configured to demodulate at least two channels contained in the modulated RF signal when the channel in use information identifies the at least two channels as containing information addressed to the at least one addressable device; and
   a combiner configured to combine the at least two channels demodulated by the demodulator unit into a digital stream when the channel in use information identifies the at least two channels as containing information addressed to the at least one addressable device, and to output the digital stream to the at least one addressable device.

2. The intelligent device of claim 1, comprising:
   a processor configured to receive the channel in use information, wherein:
   the demodulator unit comprises a plurality of demodulators each being configured to demodulate a respective one of the channels contained in the modulated RF signal; and
   the processor is configured to instruct the demodulators of the demodulator unit respectively corresponding to the at least two channels containing information addressed to the at least one addressable device to demodulate the at least two channels, respectively, based on the channels identified in the channel in use information that contain information addressed to the at least one addressable device.

3. The intelligent device of claim 2, wherein:
   the processor is configured to access a respective address of each one of the at least one addressable device; and
   the processor is configured to instruct the demodulator unit which channels contained in the modulated RF signal are to be demodulated by comparing the received channel in use information with the respective address of each one of the at least one addressable device, and to instruct the demodulators of the demodulator unit respectively corresponding to the channels containing information respectively addressed to the each one of the at least one addressable device to respectively demodulate the channels containing information addressed to the each one of the at least one addressable device.

4. The intelligent device of claim 1, wherein the demodulator unit comprises at least one demodulator configured to demodulate the at least two channels containing information addressed to the at least one addressable device.

5. The intelligent device of claim 1, wherein:
when the channel in use information identifies a single channel as containing information addressed to the at least one addressable device, the demodulator unit is configured to demodulate at least the single channel; and
the combiner is configured to output the single channel demodulated by the demodulator unit when the channel in use information identifies the single channel as containing information addressed to the at least one addressable device.

6. The intelligent device of claim 1, wherein the input is configured to receive the channel in use information as part of the modulated RF signal.

7. The intelligent device of claim 1, comprising:
a processor configured to receive the channel in use information; and
a detector configured to detect each channel contained in the received modulated RF signal that includes information addressed to the at least one addressable device, wherein:
the processor is configured to instruct the detector of a respective address of each one of the at least one addressable device; and
the detector is configured to detect each channel contained in the received modulated RF signal that includes information addressed to the at least one addressable device in accordance with the respective address of each addressable device.

8. The intelligent device of claim 1, wherein:
the intelligent device is connected to a plurality of addressable devices each having a respectively unique address; and
the combiner is configured to combine at least two channels demodulated by the demodulator unit and output a respective digital stream containing the combined at least two channels to at least one of the plurality of addressable devices to which information contained in the received modulated RF signal is addressed, respectively.

9. The intelligent device of claim 1, wherein the modulated RF signal is of a frequency in the range of 5 MHz to in excess of 1 GHz.

10. The intelligent device of claim 1, wherein:
the modulated RF signal contains at least one channel carrying an IP portion and at least one channel carrying a non-IP portion; and
the intelligent device comprises a separation unit configured to separate the at least one channel carrying the IP portion from the at least one channel carrying the non-IP portion, transmit the at least one channel carrying the IP portion to the demodulator unit, and transmit the at least one channel carrying the non-IP portion to an outlet.

11. The intelligent device of claim 10, wherein the outlet is connectable to at least one of a video receiver and a device having an IP address assignable thereto.

12. The intelligent device of claim 1, comprising:
a converter configured to convert at least one of the channels contained in the modulated RF signal into a wireless signal; and
a wireless transmitter configured to transmit the wireless signal to a device configured to receive the wireless signal.

13. The intelligent device of claim 1, comprising:
a wireless receiver configured to receive a wireless signal carrying digital information thereon; and
a wireless demodulator unit configured to demodulate the digital information carried on the wireless signal,
wherein the combiner is configured to output the digital information demodulated by the wireless demodulator unit as an outgoing digital information stream to a wideband distribution unit.

14. The intelligent device of claim 13, wherein the combiner is configured to combine the digital information demodulated by the wireless demodulator unit with digital information received from at least one addressable device, and output the combined digital information as the outgoing digital information stream to the wideband distribution unit.

15. The intelligent device of claim 1, wherein:
the intelligent device is configured to be implemented as a distribution unit for use in a wideband signal distribution system, the wideband signal distribution system being configured to distribute signals modulated onto carrier signals of a frequency in the range of about 5 MHz to at least about 1 GHz among a plurality of outlets;
the input of the intelligent device comprises a plurality of input ports configured to receive at least one incoming signal from at least one outlet;
the output of the intelligent device comprises a plurality of output ports;
the combiner is configured to combine all incoming signals at said input ports into an additive signal;
the intelligent device further comprises at least one splitter configured to split the additive signal and distribute the additive signal among said plurality of output ports for distribution to the plurality of outlets; and
the additive signal distributed to the plurality of outlets comprises at least one baseband signal on a carrier signal of a frequency in the range of about 5 MHz to at least about 1 GHz.

16. A signal distribution system comprising:
the intelligent device of claim 1;
a wideband signal distribution system connected to the intelligent device and configured to transmit the modulated RF signal to the intelligent device; and
at least one addressable device connected to the intelligent device and configured to receive the digital stream outputted by the intelligent device.

17. A signal distribution system comprising:
the intelligent device of claim 12;
a wideband signal distribution system connected to the intelligent device and configured to transmit the modulated RF signal to the intelligent device; and
at least one addressable device configured to receive at least one of the digital stream outputted by the intelligent device and the wireless signal transmitted by the wireless transmitter of the intelligent device.

18. A signal distribution system comprising:
the intelligent device of claim 13;
a wideband signal distribution system connected to the intelligent device and configured to receive the outgoing digital information stream from the combiner of the intelligent device; and
at least one addressable device configured to transmit the wireless signal carrying the digital information thereon to the intelligent device.

19. An intelligent device for receiving and processing RF signals, comprising:
   an input configured to receive a modulated RF signal containing multiple channels;
   a detector configured to detect each channel contained in the received modulated RF signal that includes information addressed to at least one addressable device, and to generate channel in use information identifying each channel that includes information addressed to the at least one addressable device;
   a demodulator unit configured to demodulate at least two channels contained in the modulated RF signal when the channel in use information identifies the at least two channels as containing information addressed to the at least one addressable device; and
   a combiner configured to combine the at least two channels demodulated by the demodulator unit into a digital stream when the channel in use information identifies the at least two channels as containing information addressed to the at least one addressable device, and to output the digital stream to the at least one addressable device.

20. The intelligent device of claim 19, comprising:
   a processor configured to receive the channel in use information generated by the detector, wherein:
   the demodulator unit comprises a plurality of demodulators each being configured to demodulate a respective one of the channels contained in the modulated RF signal; and
   the processor is configured to instruct the demodulators of the demodulator unit respectively corresponding to the at least two channels containing information addressed to the at least one addressable device to demodulate the at least two channels, respectively, based on the channels identified in the channel in use information that contain information addressed to the at least one addressable device.

21. The intelligent device of claim 20, wherein:
   the processor is configured to access a respective address of each one of the at least one addressable device; and
   the processor is configured to instruct the demodulator unit which channels contained in the modulated RF signal are to be demodulated by comparing the channel in use information generated by the detector with the respective address of each one of the at least one addressable device, and to instruct the demodulators of the demodulator unit respectively corresponding to the channels containing information respectively addressed to the each one of the at least one addressable device to respectively demodulate the channels containing information addressed to the each one of the at least one addressable device.

22. The intelligent device of claim 19, wherein the demodulator unit comprises at least one demodulator configured to demodulate the at least two channels containing information addressed to the at least one addressable device.

23. The intelligent device of claim 19, wherein:
   when the channel in use information identifies a single channel as containing information addressed to the at least one addressable device, the demodulator unit is configured to demodulate at least the single channel; and
   the combiner is configured to output the single channel demodulated by the demodulator unit when the channel in use information identifies the single channel as containing information addressed to the at least one addressable device.

24. The intelligent device of claim 19, comprising:
   a processor configured to receive the channel in use information generated by the detector, and to instruct the detector of a respective address of each one of the at least one addressable device; and
   the detector is configured to detect each channel contained in the received modulated RF signal that includes information addressed to the at least one addressable device in accordance with the respective address of each addressable device.

25. The intelligent device of claim 19, wherein:
   the intelligent device is connected to a plurality of addressable devices each having a respectively unique address; and
   the combiner is configured to combine the at least two channels demodulated by the demodulator unit and output a respective digital stream containing the combined at least two channels to at least one of the plurality of addressable devices to which information contained in the received modulated RF signal is addressed, respectively.

26. The intelligent device of claim 19, wherein:
   the modulated RF signal contains at least one channel carrying an IP portion and at least one channel carrying a non-IP portion; and
   the intelligent device comprises a separation unit configured to separate the at least one channel carrying the IP portion from the at least one channel carrying the non-IP portion, transmit the at least one channel carrying the IP portion to the demodulator unit, and transmit the at least one channel carrying the non-IP portion to an outlet, which is connectable to at least one of a video receiver and a device having an IP address assignable thereto.

27. The intelligent device of claim 19, comprising:
   a converter configured to convert at least one of the channels contained in the modulated RF signal into a first wireless signal; and
   a wireless transmitter configured to transmit the first wireless signal to a device configured to receive the first wireless signal;
   a wireless receiver configured to receive a second wireless signal carrying digital information thereon; and
   a wireless demodulator unit configured to demodulate the digital information carried on the second wireless signal,
   wherein the combiner is configured to output the digital information demodulated by the wireless demodulator unit as an outgoing digital information stream to a wideband distribution unit.

28. The intelligent device of claim 27, wherein the combiner is configured to combine the digital information demodulated by the wireless demodulator unit with digital information received from at least one addressable device, and output the combined digital information as the outgoing digital information stream to the wideband distribution unit.

29. The intelligent device of claim 19, wherein:
   the modulated RF signal received by the input includes channel identification information identifying the channels contained in the modulated RF signal; and
   the detector is configured to detect each channel contained in the received modulated RF signal that includes information addressed to the at least one addressable device based on the channel identification information included in the modulated RF signal.

30. The intelligent device of claim 19, wherein:
   the intelligent device is configured to be implemented as a distribution unit for use in a wideband signal distribution system, the wideband signal distribution system being configured to distribute signals modulated onto carrier signals of a frequency in the range of about 5 MHz to at least about 1 GHz among a plurality of outlets;

the input of the intelligent device comprises a plurality of input ports configured to receive at least one incoming signal from at least one outlet;

the output of the intelligent device comprises a plurality of output ports;

the combiner is configured to combine all incoming signals at said input ports into an additive signal;

the intelligent device further comprises at least one splitter configured to split the additive signal and distribute the additive signal among said plurality of output ports for distribution to the plurality of outlets; and the additive signal distributed to the plurality of outlets comprises at least one baseband signal on a carrier signal of a frequency in the range of about 5 MHz to at least about 1 GHz.

31. A signal distribution system comprising:

the intelligent device of claim 19;

a wideband signal distribution system connected to the intelligent device and configured to transmit the modulated RF signal to the intelligent device; and at least one addressable device connected to the intelligent device and configured to receive the digital stream outputted by the intelligent device.

* * * * *

Disclaimer

7,941,822 B2 - Earl Hennenhoefer, Harrisburg, PA (US); Richard V. Snyder, Harrisburg, PA (US); Robert D. Stine, Dillsburg, Pa (US). INTELLIGENT DEVICE SYSTEM AND METHOD FOR DISTRIBUTION OF DIGITAL SIGNALS ON A WIDEBAND SIGNAL DISTRIBUTION SYSTEM. Patent dated May 10, 2011. Disclaimer filed July 8, 2021, by the Assignee, Chanbond LLC.

I hereby disclaim the following complete claims 1-31 of said patent.

*(Official Gazette, September 6, 2022)*

(12) INTER PARTES REVIEW CERTIFICATE (1584th)
United States Patent
Hennenhoefer et al.

(10) Number: US 7,941,822 K1
(45) Certificate Issued: Dec. 30, 2019

(54) INTELLIGENT DEVICE SYSTEM AND METHOD FOR DISTRIBUTION OF DIGITAL SIGNALS ON A WIDEBAND SIGNAL DISTRIBUTION SYSTEM

(75) Inventors: Earl Hennenhoefer; Richard V. Snyder; Robert D. Stine

(73) Assignee: CHANBOND LLC

Trial Numbers:

IPR2016-00234 filed Nov. 20, 2015
IPR2016-01744 filed Sep. 6, 2016

Inter Partes Review Certificate for:

Patent No.: 7,941,822
Issued: May 10, 2011
Appl. No.: 12/068,102
Filed: Feb. 1, 2008

The results of IPR2016-00234; IPR2016-01744 are reflected in this inter partes review certificate under 35 U.S.C. 318(b).

INTER PARTES REVIEW CERTIFICATE
U.S. Patent 7,941,822 K1
Trial No. IPR2016-00234
Certificate Issued Dec. 30, 2019

AS A RESULT OF THE INTER PARTES REVIEW PROCEEDING, IT HAS BEEN DETERMINED THAT:

Claims 3, 4, 7-18, 21-22, 24-28, 30-31 are found patentable.

Claims 1, 2, 5, 6, 19, 20, 23 and 29 are cancelled.

\* \* \* \* \*